United States Patent
Seita et al.

(10) Patent No.: US 6,729,550 B2
(45) Date of Patent: May 4, 2004

(54) PORTABLE TERMINAL APPARATUS WITH IC CARD FUNCTION

(75) Inventors: Kazuhisa Seita, Kanagawa (JP); Atsushi Imai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/178,350

(22) Filed: Jun. 24, 2002

(65) Prior Publication Data
US 2003/0006280 A1 Jan. 9, 2003

(30) Foreign Application Priority Data
Jun. 27, 2001 (JP) ..................... P2001-194306

(51) Int. Cl.[7] .............................................. G06K 19/06
(52) U.S. Cl. ...................... 235/492; 235/375; 235/380; 235/382; 235/441; 235/492
(58) Field of Search ................. 235/492, 380, 235/382, 441

(56) References Cited
U.S. PATENT DOCUMENTS

| | | | | |
|---|---|---|---|---|
| 5,266,782 A | * | 11/1993 | Alanara et al. | 235/380 |
| 5,379,344 A | * | 1/1995 | Larsson et al. | 380/251 |
| 5,541,583 A | * | 7/1996 | Mandelbaum | 340/10.51 |
| 5,594,227 A | * | 1/1997 | Deo | 235/380 |
| 5,698,836 A | * | 12/1997 | Fujioka | 235/492 |
| 6,044,470 A | * | 3/2000 | Kuriyama | 713/202 |
| 6,045,043 A | * | 4/2000 | Bashan et al. | 235/441 |
| 6,095,416 A | * | 8/2000 | Grant et al. | 235/449 |
| 6,179,205 B1 | * | 1/2001 | Sloan | 235/382 |

\* cited by examiner

*Primary Examiner*—Diane I. Lee
*Assistant Examiner*—Kumiko C. Koyama
(74) *Attorney, Agent, or Firm*—Jay H. Maioli

(57) ABSTRACT

A password corresponding to an IC card or a service is stored or registered in a terminal apparatus provided with a preferably contactless IC card section having a read/write function. A password is inputted before utilizing the IC card function. The IC card function, which is disabled for utilization under other conditions, is enabled for utilization during a period of time only when the inputted password matches the registered password, thus even when the device is lost or stolen, others cannot have access to the services available for the apparatus without authentication.

8 Claims, 3 Drawing Sheets

FIG.3

| SERVICE ID | PASSWORD |
|:---:|:---:|
| SID1 | 1357 |
| SID2 | 8674 |
| SID3 | 0000 |
| ⋮ | ⋮ |

FIG.4

| SERVICE ID | TYPICAL RELEASE DURATION(SECONDS) |
|:---:|:---:|
| SID1 | 5 |
| SID2 | 30 |
| SID3 | 60 |
| ⋮ | ⋮ |

PORTABLE TERMINAL APPARATUS WITH IC CARD FUNCTION

CROSS REFERENCE TO RELATED APPLICATIONS

This application claims priority to Japanese Patent Application No. JP 2001-194306, filed on Jun. 27, 2001, the disclosure of such application being herein incorporated by reference to the extent permitted by law.

BACKGROUND OF THE INVENTION

1. Field of the Invention

The present invention relates to a terminal apparatus having an IC card including read/write functions. More specifically, the present invention relates to a portable terminal apparatus having a contactless IC card including a read/write function.

2. Description of the Related Art

An IC card that ISO(International Organization for Standardization)14443 and the like have been standardizing is typically constructed by embedding an IC (integrated circuit) into a plastic card. Such card is advantageous in view of storage capacity and security in comparison to magnetic cards. A contactless IC card may transmit data from the card to a remote device and receive data transmitted from the remote device through a radio communication system using electromagnetic waves or the like. While having such a contactless IC card function with a portable terminal apparatus like a portable telephone, etc., a function of the portable terminal apparatus is expanded. As a result, an inconvenience in that a user has to carry both the portable terminal apparatus and the IC card separately can be alleviated. Because the portable terminal apparatus is ordinarily provided with a display, information retained in the IC card can be viewed through the display.

However, such a portable terminal apparatus has the following drawbacks, which typically occurs with a portable telephone provided apparatus having the contactless IC card.

At present, the user of the IC card cannot identify the IC card as a prepaid card. Accordingly, when a portable terminal apparatus having the IC card function is lost or stolen, there is a risk that an unauthorized person having the device in possession might use contents and/or services available with the card, such as a commuter pass, electronic money, tickets, etc.

Further, depending on the kind of service available with the IC card, in coming future, there might be requirements for verification of the user for using the IC card, namely, authentication of the user and the like. However, such authentication may not always apply to all services.

SUMMARY OF THE INVENTION

In view of the above-mentioned problems, it is preferable according to a preferred embodiment of the present invention to provide a portable terminal apparatus having a contactless IC card including a read/write (hereinafter referred to as "R/W") function, which can prevent others from using electronic money, a commuter pass, tickets or other kinds of services or functions in an unauthorized manner when any of them are lost or stolen.

It is preferable according to a preferred embodiment of the present invention to provide a portable terminal apparatus that may provide user-visibility and user-friendliness for a user when utilizing the IC card.

According to a preferred embodiment of the present invention, there is provided a a portable terminal apparatus having a contactless IC card function provided with a storage unit that stores and registers a password required when utilizing the contactless IC card function; a reception unit that receives inputting operation of a password from a user before utilizing the IC card function; a comparison unit that compares the registered password with the inputted password; and a control unit in which the IC card function is made available or enabled for use when the inputted password matches the registered password and is unavailable or disabled for use under other conditions.

According to another preferred embodiment of the present invention, a password required for utilizing the IC card function is registered, so that a "key" is locked with regard to the IC card function. In order to unlock the key, the user must input a password being that matches the registered password. Accordingly, the user can lock the key with regard to the IC card function in the portable terminal apparatus at the user's intention regardless of whether or not there exists authentication of the user in relation to a service when using the IC card.

Although the password is of course applicable to the IC card function as a whole, such password may be set separately for each of a plurality of services available with the IC card. In such case, the password may be inputted, compared, the IC card function is disabled and enabled for each of the services in isolation.

Preferably, after the IC card function is enabled for use or utilization and after a predetermined period of time is elapsed, the enabled status is automatically retuned back to the disabled status. As a result, it is possible to avoid leaving the "lock" open after it has been released.

Further, the portable terminal apparatus may have a unit in which the user can change and set the predetermined period of time.

Further, in the portable terminal apparatus, the period of time may be set for each service available in the IC card. There is a possibility that a proper period of time from the time of releasing the "lock" to the time of utilizing the IC card function may be changed depending type of user or service. Accordingly, it is advantageous to make "the predetermined period of time" changeable for each user or each service.

Further, the portable terminal apparatus may have a display unit that at least displays information with regard to a service in utilization with the IC card function, after the disabled status has been released to be enabled for use. Thereby, measure and visibility of a remaining time duration from the time when the "lock" is released to the time when the IC card is utilized may be provided to the user.

Further, a display unit that at least displays information with regard to a service in utilization with the IC card on the display in combination with or independently of display regarding to the countdown information. Thereby, for example, information necessary for utilization of an IC card (service) is displayed before and after the utilization. (It is to be noted that the information may include a logo mark and an outstanding amount in case of utilizing electronic money, and artist name, date, place, and the like in case of utilizing a live concert ticket, for example, and route or section information, expiration date, and the like in case of a commuter pass. Thereby, the user's visibility and user-friendliness can be provided.

Also preferably, the portable terminal apparatus according to a preferred embodiment of the present invention has a contactless IC card section that performs or executes the contactless IC card function, which is constituted by exclusive CPU, memory, and reader/writer module, while the memory stores the password. As a result, security of the apparatus is improved by incorporating the password of the user into the IC card section.

BRIEF DESCRIPTION OF THE DRAWINGS

The above and other objects, features, and advantages of the present invention will become more apparent from the following description of the presently preferred exemplary embodiments of the invention taken in conjunction with the accompanying drawings, in which:

FIG. 3 shows a view illustrating an example of password table describing a correspondence relationship between service ID and password, according to a preferred embodiment of the present invention; and FIG. 4 shows a view of an example of temporal release duration table describing a correspondence relationship between service ID and temporal release duration (in seconds), when setting of temporal lock release duration is permitted, according to a preferred embodiment of the present invention.

DESCRIPTION OF THE PREFERRED EMBODIMENTS

Figure 1:
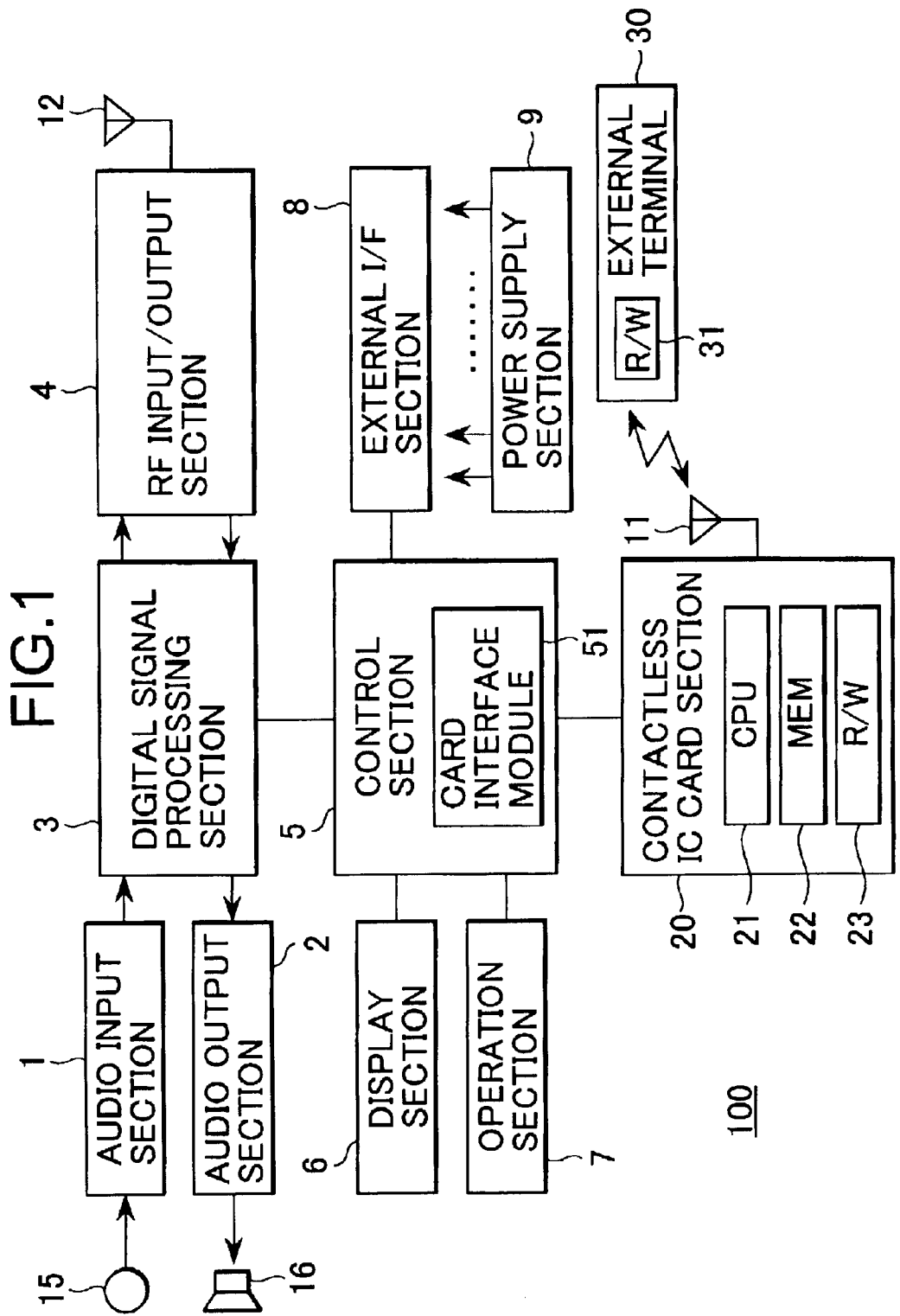
FIG. 1 shows a block diagram of a portable telephone as an example of portable terminal apparatus having a contactless IC card, according to a preferred embodiment of the present invention.

FIG. 1 shows a block diagram of a portable telephone apparatus 100 as an example of portable terminal apparatus having a contactless IC card function, according to a preferred embodiment of the present invention. It has to be noted that the portable telephone apparatus 100 is not limited to a portable telephone, but should include for example a PDA (personal digital assistant) and the like.

The portable telephone apparatus 100 includes a control section 5 and a digital signal processing section 3, a display section 6, an operation section 7, an external I/F section 8, and a contactless IC card section 20 being connected to the control section 5. The control section 5 is a main section for realizing the functions of the portable telephone apparatus, and it may include a CPU, an EEPROM, a Flash ROM, an SRAM and the like (not shown in the figures). The control section 5 in the present embodiment includes a card interface module 51 that transmits and/or receives commands and/or data between the section 5 and the contactless IC card section 20.

The digital signal processing section 3 includes exclusive circuits for convolution coding, slot interleave, delay detection, convolution decoding and the like, mainly using a DSP (Digital Signal Processor). The digital signal processing section 3 is connected to an audio input section 1, an audio output section 2, an RF input/output section 4, and the control section 5. The audio input section 1 has a microphone amplifier, a filter, an A/D (Analog/Digital) converter and the like. The audio output section 2 has a D/A (Digital/Analog) converter, a filter, a speaker amplifier and the like. The RF input/output section 4 is constituted by a quadrature modulator, a gain amplifier, a power amplifier, a diversity unit, a mixer, an IF demodulator and the like. An analogue audio signal from a microphone 15 is converted to digital signal and encoded by the audio input section 1. The encoded signal is converted from a base band signal to an RF signal and transmitted by way of an antenna 12. A signal received by way of the antenna 12 is converted to a base band signal by the RF input/output section 4, supplied to the digital signal processing section 3 by the section 4, and decoded by the digital signal processing section 3. The decoded signal is converted to an analogue audio signal by the audio output section 2. The analogue audio signal is supplied to a speaker 16 by the audio output section 2.

The display section 6, which displays information to a user, includes an LCD driver, an LCD display device and the like. The operation section 7 is constituted by a keyboard, a jog dial, a joystick or the like, and is used for inputting operating information into the portable telephone apparatus 100. The external I/F section 8, which serves as interface between the device 100 and each of any of external devices, may include a communication interface circuit, a 16-pin connector and the like. Power supply section 9, which generates and supplies from the battery electric power necessary for each of the shown blocks in FIG. 1, may include a power supply circuit, a charging circuit used for battery supply, a protecting circuit for protection overcurrent and over-voltage,.

The contactless IC card section 20 (as a contactless card is typically realized in form of an integrated circuit, the description hereinafter refers to the card as "IC card") is provided with an exclusive CPU 21, a Flash ROM (referred to as "MEM" in FIG. 1) that includes a data-retaining nonvolatile memory, a program and the like, a reader/writer (R/W) module 23, an interfaces (not shown) and so on. The contactless IC card section 20 is connected to the card interface module 51 that, in the present embodiment, is located in the control section 5. The contactless IC card section 20 transmits and receives data between the section 20 and an external terminal 30 (or an IC card of similar type) capable of performing radio communication with the contactless IC card section 20 by way of an antenna 11.

The card interface module 51 is embedded as a part of the control section 5 and includes a software module that serves both as a user interface between the user and the contactless IC card section 20.

Reader/writer (labeled "R/W" in FIG. 1) module 31 of the external terminal 30 has a function of transmitting and receiving commands, data, etc. between the terminal 30 and the contactless IC card section 20. The external terminal 30 may include for example an automatic ticket gate such as railway or bus tickets, commuter tickets and the like, a shopping terminal (for stores, shopping malls, etc.), a vending machine, or the like. The terminal has an antenna unit to which the contactless IC card section 20 can be approached. Typically, the external terminal 30 is connected to a service providers (servers), not shown.

A first feature of the present invention lies in that the portable terminal apparatus according to the present invention has a function of user authentication (recognition of authorized user) and a locking function of stopping the IC card function, a locking function for interrupting the functions of the IC card, such lock function being associated with the user authentication. According to this preferred embodiment, there is provided a means for registering and verifying the password as a means for authenticating the user. The user registers the user password in the contactless IC card section 20 before using the IC card function. The user may register a different password for each service such as commuter pass, electronic money, tickets or the like. In this case, whenever an application relating to a new service is added to the portable terminal apparatus, a corresponding new password can be registered.

FIG. 3 shows an example of password table 300 for storing a password corresponding to each service ID. The password table 300 is stored in the memory 22 (MEM in FIG. 1) of the contactless IC card section 20. It is assumed that herein, when any four-digit number other than a default number (e.g. "0000") is registered, the IC card function will be set to lock mode. Thereafter, if the user does not input the registered password, the user cannot use the IC card function (and any associated service). It has to be noted that it is not necessary that such a password can be set for over all the services. Also, depending on a kind of service, there may be a case in which no password can be set at the user side. For example, as such kind of service, there are services used with high frequency and with limited application, like a commuter pass and the like.

The lock mode according to a preferred embodiment of the present invention is for inputting a correctly registered password just before using the IC card section 20 in a lock status, i.e., a status in which the IC card is not available under normal utilization, so that the lock is released by changing the current lock status into a temporal lock release status in which the card is under available status. The password input operation is performed upon activating a password setting mode performed with a user interface function using the control section 5, the display section 6, and the operation section 7. The password number setting mode can be selected and activated by way of a menu to be displayed using the display section 6. However, it has to be noted that the preset invention is not limited to this preferred embodiment.

A second feature of the present invention lies in that there is a timer function for providing retaining duration of the temporal lock release status, and when the IC card 20 is not used within the retaining time duration, then the current status is automatically turned back to the lock status with a time-out processing. The timer function is available when terminating utilization of the card or when utilization of the IC card 20 is abandoned, after the lock is released by inputting a password. The timer function may be controlled through using the IC card 20 in place of the control section 5. Alternatively, this function may be also realized through using both of them. Further, when the IC card is utilized within the designated time duration (based on a timer set value) after the lock release, in other words, when processing is performed between the IC card 20 and the R/W module 31 in the external terminal 30, etc., the control section 5 receives information of the normal card utilization (Status), resulting in releasing the timer processing and returning the present status back to the previous lock status. In such a case, the retaining duration corresponding to the Temporal lock release status is a time duration that is set beforehand for each of the services.

A third feature of the present invention lies in that there is a user setting function that can be customized by the user, in which selection of a lock mode and an unlock mode can be set with regard to the IC card function and setting of the temporal lock release duration e.g. using a timer when the lock mode is selected, using a password at the user's choice. Here, the unlock status denotes a status where the IC card is constantly available without using the lock function. Thereby, the user may select user friendliness instead of the burden of inputting a password before using the IC card and also giving precedence over concerns on possibility of damage owing to loss, theft, or the like. The lock/unlock setting function may be set by the user, using a whole IC card unit or by each of services provided using the IC card. For example, the lock setting can be performed beforehand and with respect to the entire IC card unit. On the other hand, the Unlock setting can be performed with regard to only frequently used service(s) provided through using the IC card such as a commuter pass service. Here, picking up the above-mentioned example of the password table 300, the performance of the unlock setting corresponds to returning the current status back to a default password "0000".

FIG. 4 shows an example of a temporal release duration table 400 in which there is provided a correspondence relationship between the temporal release duration (in seconds, for example) and a service ID, is retained when permitting the user setting the temporal lock release duration. The temporal release duration table 400 is stored into the control section 3 when the control section 5 performs the timer control, and stored into the IC card 20 when the IC card section 20 performs the timer control. The temporal lock release duration is inputted by activating a mode (hereinafter, called lock release duration setting mode) performed by using a user interface (UI) by the control section 5, the display section 6, and the operation section 7. Typically, the above-mentioned inputting operation is selected and activated by way of a menu displayed on the display section 6. However, it has to be noted that such an inputting operation is not limited to the present preferred embodiment.

A fourth feature of the present invention lies in that a function is provided in which the user can estimate and have visibility of the remaining duration of time in which the IC card can be used after the lock is released, upon displaying the temporal release duration set by the user in a countdown manner using for example a timer. The control section 5 and the display section 6 perform the display in a countdown display.

A fifth feature of the present invention lies in that inherent information of service that is unlocked and provided through using the IC card is displayed in combination with the above-mentioned countdown display or independently thereof. For example, when receiving service regarding electronic money after releasing the lock, the presently outstanding amount and the outstanding amount after receiving the service are displayed on the LCD screen of the display section 6. Thereby, it is very convenient for the user to previously confirm whether or not there is a sufficient outstanding amount regarding as amount of money to be paid, and confirm an outstanding amount after electronic money is paid. In addition, when using a commuter pass as electronic money, a valid area, a valid period and the like and, when using a ticket as electronic money, name of exhibition, artist name, date and place of exhibition, seat number and the like can be displayed. Display of countdown of the temporal lock release duration and display of valid data for each service available in the card is realized through data communication between the control section 5 and the contactless IC card section 20, as well as display performed by the display section 6.

Figure 2:
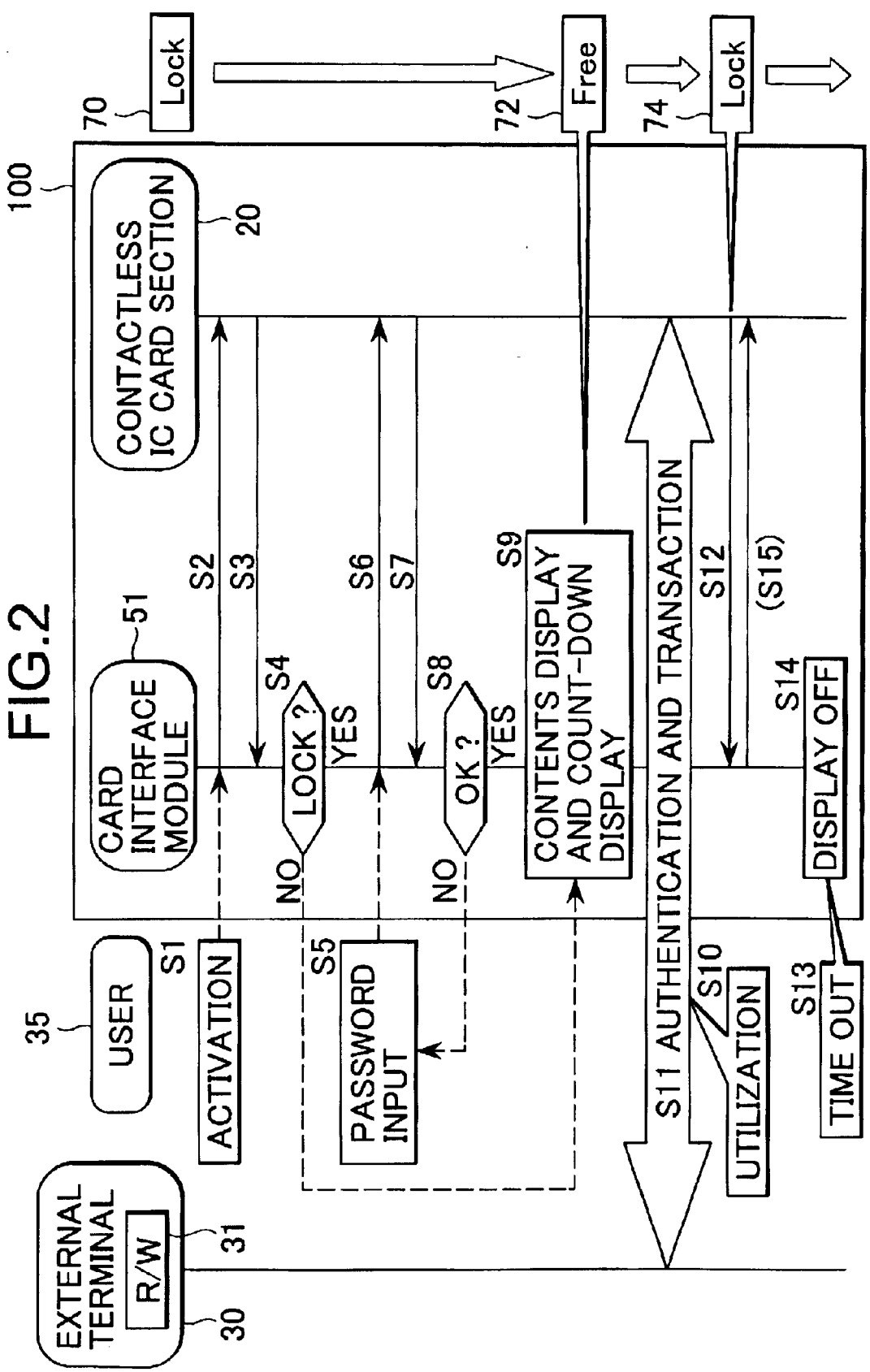
FIG. 2 shows a view illustrating an example of lock mode sequence, according to a preferred embodiment of the present invention.

FIG. 2 shows an example of sequence of the lock mode. Reference numerals in FIG. 2 are the same as those in FIG. 2 with regard to the same sections.

A sequence flow of the present preferred embodiment of sequence is described as follows.

S1: Activation of operation

At step S1, the user 35 instructs the present sequence activation. The activation is for selecting IC cards, in other words, services to be used. For example, items "card" and "card (service) to be used" are selected from items displayed on the menu display. Alternatively, an exclusive card button is provided so that a card function selection and/or a setting menu may be directly activated by pressing the button.

S2: Request for confirmation of lock status

At step S2, when determining selection of the card (service) at step S1, then the card interface module 51 issues a command to the IC card section 20 for confirming whether or not the determined designated service is under the lock status.

S3: Response 1

The contactless IC card section 20 returns a code representing the present status (lock or unlock) status as the response back to the card interface module 51. In FIG. 2, an initial status is a lock status 70.

S4: Response judgment 1

If the response at the Step S4 is unlock, then it is not necessary to input the password, thus advancing to step S9 described below. On the other hand, if the response at the Step S4 is lock, then input of the password is required, resulting in advancing to step S5 described below.

S5: Inputting password

The card interface module 51 makes displaying of a menu for requesting the user to input the user password and the password designated in a predetermined form, e.g. a four-digit numeral form, is acquired from the input from the user.

S6: Request for temporal lock release

The card interface module 51 regards the password inputted by using an input key for the portable telephone at Step 5 as an argument and issues a command for requesting the temporal release of lock of the contactless IC card section 20.

S7: Response 2

The contactless IC card section 20 verifies the augment (password) against a previously registered password. If they match, then a response "OK" is retuned to the card interface module 51. On the other hand, if they do not match, then a response "NG" is returned back thereto.

S8: Response judgment 2

If the response at the Step S7 is "OK", then the card interface module 51 advances to following Step S9. On the other hand, if that at the Step S7 is "NG", then the module 51 returns to the step S5 and requests the user to input the user password again.

S9: Displaying contents and countdown information

At Step S9, first, a temporal lock release status 72 is established for the first time and, for example, in case of a commuter pass, display may be performed for the section and the expiration or validity date; in case of electronic money, display may be performed for the outstanding amount; and in case of a ticket, display may be performed the date of the performance, the place, the seat number, and the like. If the present flow jumps from step S4 to the step S9, the countdown information is not displayed because such information is not necessary.

S10: Utilization

The user 35 can utilize the contactless IC card function under the lock release status. In other words, the antenna 11 of the portable telephone 100 is directed to the external R/W module 31, thereby mutual authentication can be established between the telephone 100 and the R/W module 31.

S11: Authentication and transaction

In the above-mentioned mutual authentication, confirmation may be performed whether both the telephone 100 and the R/W module 31 have the IC card function regarded as authentic. Depending on the service to be utilized, additionally a processing of authentication for the user, himself or herself may be performed, e.g., by inputting of ID and a password related to the service.

S12: Response 3 (normal completion)

If the processing at steps S1 to S9 is normally completed, then the contactless IC card section 20 returns back a result of the normal completion to the card interface module 51 at Step S12. Thus, the card interface module advances to subsequent Step S14.

S13: TIME OUT

At the Step S9, in a case where the user has not utilized the IC card (the user has not had the IC card directed to the external R/W module 31) during a predetermined lapse of time after the IC card function (service) is made to be available for utilization, the expiration of the designated duration, i.e. "TIME OUT" becomes a trigger for changing the current status to the lock status 74. When the timer function is controlled by the control section 5, the card interface module 51 requests the Lock setting for the contactless IC card section 20 at following Step S15. When the timer function is controlled by the contactless IC card section 20, the contactless IC card section 20 returns to the Lock status 74 upon time-out.

S14: Switching off display

At Step S14, the contents display and countdown display that have been activated are completed. Thereafter, the current display status returns back to a normal receiving status, standby status or the like.

Although the invention having been described hereinabove in its preferred form with a certain degree of particularity, other changes, variations, combinations and sub-combinations are possible therein. It is therefore to be understood that any modifications will be practiced otherwise than as specifically described herein without departing from the scope and spirit of the present invention.

For example, the number of digits as well as numerical values of the password and value of the temporal release duration are merely examples for explanatory purposes. Thus, the present invention is not limit to such figures presented herein. The password is not required to be limited to a numeric value, so that the password may include characters and/or symbols. Also, it has been described that the sequence of FIG. 2 is activated using a command from the user. In case of communicating with an external terminal, when the Lock status is detected, the contactless IC card section 20 may request input of a password against the card interface module 51.

It is claimed:

1. A portable terminal apparatus having an integrated circuit (IC) card function and employing an IC card, the apparatus comprising:

a storage unit for storing a first password necessary for utilizing a function of said IC card;

a reception unit for receiving a second password before utilizing said function of said IC card;

a comparison unit for comparing said first password with said second password;

a card interface module for sending and receiving commands to and from said IC card; and a control unit arranged in said IC card for enabling utilization of said function of said IC card when said second password matches said first password by sending a temporary lock release command to said card interface module and for disabling utilization of said function of said IC card when said second password does not match said first password by sending a set lock command to said card interface module, wherein after said function of said IC card is enabled by sending said temporary lock release command, said function of said IC card is automatically disabled by sending said set lock command to said card interface module after a predetermined period of time has elapsed.

2. The portable terminal apparatus according to claim 1, wherein a different said first password is provided for each respective service related to said IC card function; and input of said second password, comparison with said first password and disabling and/or enabling of said IC card function is performed independently for each said respective service related to said IC card function.

3. The portable terminal apparatus according to claim 1, further comprising a setting unit for time setting said predetermined period of time.

4. The portable terminal apparatus according to claim 1, wherein said predetermined period of time is set separately for each of a plurality of services related to said IC card function.

5. The portable terminal apparatus according to claim 1, further comprising a display unit for displaying countdown information on time elapsed during said predetermined period of time.

6. The portable terminal apparatus according to claim 1, further comprising a display unit for displaying information related to a service utilized with said IC card function, after said IC card function is enabled.

7. The portable terminal apparatus according to claim 1, further comprising an IC card unit for executing said IC card function, said IC card unit comprising a processing unit, a memory unit, and a reading and/or writing unit, wherein said memory unit includes said storage unit for storing said first password.

8. An apparatus having a contactless integrated circuit (IC) card function and employing a contactless IC card, the apparatus comprising:

storage means for storing a first password necessary for utilizing a function of said contactless IC card;

reception means for receiving a second password before utilizing said function of said contactless IC card;

comparison means for comparing said first password with said second password;

a card interface module for sending and receiving commands including a temporary lock release command and a set lock command to and from said contactless IC card; and control means arranged in said contactless IC card for disabling utilization of said function of said contactless IC card under a normal condition and for enabling utilization of said function of said contactless IC card by sending said temporary lock release command to said card interface module when said second password matches said first password, wherein after said function of said contactless IC card is enabled by sending said temporary lock release command, said function of said contactless IC card is disabled by sending said set lock command to said card interface module after a predetermined period of time has elapsed.

* * * * *